(No Model.)

J. O. KILROY.
TOBACCO PIPE.

No. 302,412.      Patented July 22, 1884.

WITNESSES:

INVENTOR:
J. O. Kilroy
BY
ATTORNEYS.

United States Patent Office.

JOHN OWEN KILROY, OF ALBANY, NEW YORK.

TOBACCO-PIPE.

SPECIFICATION forming part of Letters Patent No. 302,412, dated July 22, 1884.

Application filed January 3, 1884. (No model.)

*To all whom it may concern:*

Be it known that I, JOHN OWEN KILROY, of Albany, in the county of Albany and State of New York, have invented a new and Improved Tobacco-Pipe, of which the following is a full, clear, and exact description.

The object of my invention is to provide a new and improved tobacco-pipe in which a detachable bowl is held on a stem, thus permitting the bowl to be replaced in case it becomes filthy or is broken.

The invention consists in a tobacco-pipe constructed with a stem provided with an internally-screw-threaded neck, on which a saucer and a bowl are placed, the said saucer and bowl being held in place by a hollow screw passed through the bottom of the bowl and the saucer and screwed into the threaded neck.

Reference is to be had to the accompanying drawings, forming part of this specification, in which similar letters of reference indicate corresponding parts in all the figures.

Figure 1:
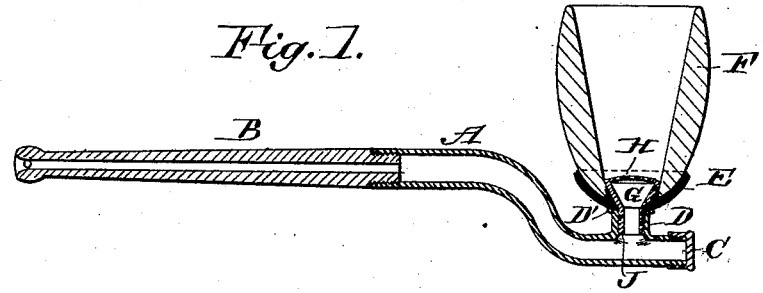
Figure 2:
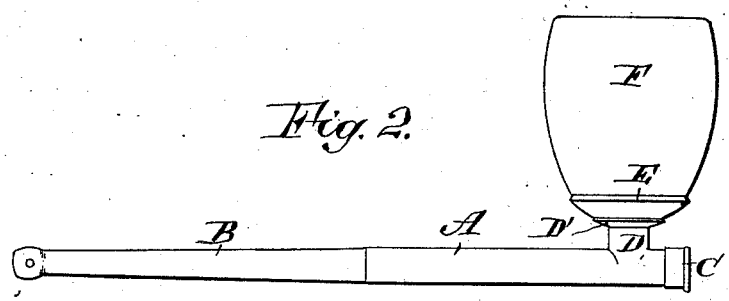
Figure 3:
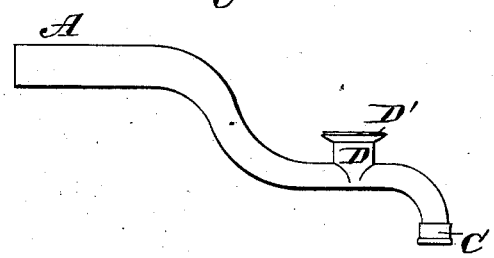

Figure 1 is a longitudinal sectional elevation of my improved tobacco-pipe. Fig. 2 is a longitudinal view of the same, showing a modification of the stem. Fig. 3 is a longitudinal elevation of another construction of the stem.

The stem A is provided at one end with a mouth-piece, B, and at the opposite end with a detachable cap, C, to permit removing drippings, &c. A short distance from its outer end the stem is provided with an upwardly-projecting neck, D, screw-threaded internally, and provided at its upper end with an outwardly-projecting flange, D'. A saucer, E, having a central aperture, is placed on the flange D' of the neck D, and on the said saucer the bowl F is placed. A hollow funnel-shaped screw, G, fitting in the bottom of the bowl, is provided with a perforated top, H, and with a tubular bottom stem, J, screw-threaded externally, which stem is screwed into the neck D, and thus presses and holds the bowl on the saucer and the saucer on the neck, and also forming close joints to prevent a leakage of air. If the bowl is broken or must be cleaned, it can readily be removed and replaced by another. Clay, porcelain, brier-wood, or other bowls can be held on a metal or rubber stem, which can be of any desired shape or construction. The hollow screw G does not interfere with the passage of the smoke.

Having thus described my invention, what I claim as new, and desire to secure by Letters Patent, is—

1. In a tobacco-pipe, the combination, with a stem having an internally-screw-threaded neck, of a bowl and a hollow funnel-shaped screw passed through the bottom of the bowl and screwed into the neck, substantially as herein shown and described.

2. In a tobacco-pipe, the combination, with a stem having an internally-screw-threaded neck, of a saucer placed on the same, a bowl placed on the saucer, and a hollow screw passed through the bottom of the bowl and through the saucer and screwed into the neck, substantially as herein shown and described.

3. In a tobacco-pipe, the combination, with the stem A, having an internally-screw-threaded neck, D, of the saucer E, placed on the neck, the bowl F, placed on the saucer, and of the hollow screw G, provided with an apertured top, H, and with an externally-screw-threaded stem, J, substantially as herein shown and described.

4. In a tobacco-pipe, the combination, with the stem A, having an internally-screw-threaded neck, D, provided with a flange, D', of the saucer E, the bowl F, and the hollow screw G, provided with an apertured top, H, and a screw-threaded stem, J, substantially as herein shown and described.

JOHN OWEN KILROY.

Witnesses:
THOMAS J. DOLAN,
JOHN A. HEENAN.